United States Patent [19]
Maturi et al.

[11] Patent Number: 5,982,830
[45] Date of Patent: *Nov. 9, 1999

[54] HYSTERETIC SYNCHRONIZATION SYSTEM FOR MPEG AUDIO FRAME DECODER

[75] Inventors: Greg Maturi, Tracy; Gregg Dierke, San Jose, both of Calif.

[73] Assignee: LSI Logic Corporation, Milpitas, Calif.

[*] Notice: This patent is subject to a terminal disclaimer.

[21] Appl. No.: 08/843,222

[22] Filed: Apr. 14, 1997

Related U.S. Application Data

[63] Continuation of application No. 08/376,005, Jan. 20, 1995, Pat. No. 5,621,772.

[51] Int. Cl.⁶ .................................................. H04C 7/06
[52] U.S. Cl. ........................ 375/366; 375/365; 370/514
[58] Field of Search .................................. 375/354, 355, 375/359, 360, 364, 365, 366, 368; 381/94; 327/141, 162; 348/512, 513, 516, 518, 517, 390, 497, 500; 370/503, 506, 509, 514

[56] References Cited

U.S. PATENT DOCUMENTS

| | | | |
|---|---|---|---|
| 3,867,579 | 2/1975 | Colton et al. | 179/15 A |
| 4,241,398 | 12/1980 | Carll | 364/200 |
| 4,394,774 | 7/1983 | Widergren et al. | 382/250 |
| 4,649,536 | 3/1987 | Krinock | 370/102 |
| 4,660,079 | 4/1987 | Devimeaux et al. | 358/141 |
| 4,675,886 | 6/1987 | Surie | 375/116 |
| 4,839,733 | 6/1989 | Karamon et al. | 358/341 |
| 5,202,761 | 4/1993 | Cooper | 358/149 |
| 5,287,182 | 2/1994 | Haskell et al. | 348/500 |
| 5,294,983 | 3/1994 | Ersoz et al. | 348/521 |
| 5,299,236 | 3/1994 | Pandula | 375/373 |
| 5,351,090 | 9/1994 | Nakamura | 348/484 |
| 5,351,092 | 9/1994 | Poimboeuf et al. | 348/512 |
| 5,386,233 | 1/1995 | Keith | 348/407 |
| 5,396,497 | 3/1995 | Veltman | 370/100.1 |
| 5,420,801 | 5/1995 | Dockter et al. | 364/514 |
| 5,430,485 | 7/1995 | Lankford et al. | 348/423 |
| 5,442,390 | 8/1995 | Hooper et al. | 348/7 |
| 5,446,839 | 8/1995 | Dea et al. | 395/163 |
| 5,448,568 | 9/1995 | Delpuch et al. | 372/94.2 |
| 5,502,573 | 3/1996 | Fujinami | 386/65 |
| 5,521,922 | 5/1996 | Fujinami et al. | 370/543 |
| 5,621,772 | 4/1997 | Maturi et al. | 375/366 |

Primary Examiner—Chi H. Pham
Assistant Examiner—Bryan Webster

[57] ABSTRACT

An audio decoder decodes audio frames included in a Motion Picture Experts Group (MPEG) bitstream for presentation or playing. Each audio frame includes a synchronization code and a frame header, followed by audio data. The synchronization codes are detected, and it is determined that the decoder is synchronized to the bitstream after a first predetermined number, for example three, of successive valid audio frames have been detected. It is similarly determined that the decoder is unsynchronized to the bitstream after a second predetermined number, which can also be three, of successive invalid audio frames have been detected. Each and every frame is determined to be valid if its header parameters are valid, it passes the CRC error check (optional), no syntax errors are detected and its frame length (interval) is as expected. The proper frame interval can be determined from the information in the header following each valid synchronization code, or can be determined by counting the number of bits between the first and second valid synchronization codes. The decoder can be muted while out of synchronization to minimize distortion of the audio presentation.

29 Claims, 3 Drawing Sheets

HYSTERETIC SYNCHRONIZATION SYSTEM FOR MPEG AUDIO FRAME DECODER

This application is a continuation of U.S. application Ser. No. 08/376,005, entitled HYSTERETIC SYNCHRONIZATION SYSTEM FOR MPEG AUDIO FRAME DECODER, filed Jan. 20, 1995 by Greg Maturi, now U.S. Pat. No. 5,621,772.

BACKGROUND OF THE INVENTION

1. Field of the Invention

The present invention generally relates to the art of audio/video data compression and transmission, and more specifically to a hysteretic synchronization system for a Motion Picture Experts Group (MPEG) audio frame decoder.

2. Description of the Related Art

Constant efforts are being made to make more effective use of the limited number of transmission channels currently available for delivering video and audio information and programming to an end user such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels provides cost reduction and increased broadcast capacity.

The number of separate channels that can be broadcast within the currently available transmission bandwidth can be increased by employing a process for compressing and decompressing video signals. Video and audio program signals are converted to a digital format, compressed, encoded and multiplexed in accordance with an established compression algorithm or methodology.

The compressed digital system signal, or bitstream, which includes a video portion, an audio portion, and other informational portions, is then transmitted to a receiver. Transmission may be over existing television channels, cable television channels, satellite communication channels, and the like.

A decoder is provided at the receiver to de-multiplex, decompress and decode the received system signal in accordance with the compression algorithm. The decoded video and audio information is then output to a display device such as a television monitor for presentation to the user.

Video and audio compression and encoding is performed by suitable encoders which implement a selected data compression algorithm that conforms to a recognized standard or specification agreed to among the senders and receivers of digital video signals. Highly efficient compression standards have been developed by the Moving Pictures Experts Group (MPEG), including MPEG 1 and MPEG 2. The MPEG standards enable several VCR-like viewing options such as Normal Forward, Play, Slow Forward, Fast Forward, Fast Reverse, and Freeze.

MPEG audio compression produces compact disk (CD) quality audio at very high compression rates. To save bits in the algorithm, a very simple 12-bit synchronization code, binary 1111 1111 1111 ("FFF" in hexadecimal notation) is used to designate the beginning of a frame of compressed audio data. However, unlike video synchronization codes, which will never appear anywhere else in a video bitstream, audio sync codes may be emulated in the data. These are known as false or invalid synchronization codes, and may occur anywhere in the audio data stream.

It is necessary to differentiate these invalid synchronization codes from true synchronization codes, which only appear at the beginning of an audio frame. If decoding of audio data is begun before proper synchronization is attained, the result will be a severely distorted audio presentation.

Once proper synchronization is attained, bitstream errors can temporarily cause misplaced synchronization codes, and result in loss of synchronization. For this reason, it is necessary to maintain synchronization in spite of occasional data errors. This is especially critical in audio/video applications in which the audio presentation must be synchronized in time to the video presentation.

The prior art method uses only the 12 bit synchronization code, which means that there is a significant possibility of initially synchronizing to a false synchronization code and thereby attempting to decode invalid audio data. Eventually, a valid synchronization code will be found, but until that time, the results are audibly unpleasant.

A 20-bit "header" immediately follows each valid synchronization code and contains basic information crucial to proper decoding. In some cases, some of these parameters are known in advance, and the extra bit values can be used to augment the regular synchronization code search. This is an improvement over relying on the synchronization code alone, but does not provide a complete solution.

The prior art method is susceptible to false synchronization codes, thereby producing bad output data. Also, attempts to re-establish synchronization through unrestrained synchronization code searches may cause a significant shift in the audio time base so that, for example, audio presentation is no longer synchronized with video presentation.

The synchronization code uniqueness can be increased by adding user bits. However, this is detrimental to efficient data compression, and prevents the scheme from being used in a universal or general purpose synchronizer implementation.

For these reasons, there exists a need in the art for a method of synchronizing an MPEG audio decoder which prevents false initial synchronization, while also presenting loss of synchronization caused by occasional data errors.

SUMMARY OF THE INVENTION

An audio decoder system embodying the present invention decodes audio frames included in a Motion Picture Experts Group (MPEG) bitstream for presentation or playing. Each audio frame includes a synchronization code and a frame header, followed by audio data.

The synchronization codes are detected, and it is determined that the decoder is synchronized to the bitstream after a first predetermined number, for example three, of successive valid synchronization codes have been detected. It is similarly determined that the decoder is unsynchronized to the bitstream after a second predetermined number, which can also be three, of successive invalid synchronization codes have been detected.

A first synchronization code is determined to be valid if the syntax of the corresponding header is correct. Successive synchronization codes are determined to be valid if they are spaced from each other by the proper interval following the first valid synchronization code, and the syntax of their headers is correct.

The proper interval can be determined from the information in the header for the first valid synchronization code, or can alternatively be determined by counting the number of bits between the first and second valid synchronization codes. This latter method is applicable to "free-form" data structure.

The decoder can be muted while out of synchronization to minimize distortion of the audio presentation.

The hysteretic synchronization system according to the present invention solves both of problems described above which have existed in the prior art. Achieving initial synchronization is made "difficult", so that the probability of being properly aligned with a true synchronization code is maximized.

Once synchronized, losing synchronization code is also made difficult in that a single missed synchronization code will not desynchronize the system. The hysteretic nature of the present system is analogous to hysteretic properties that are advantageously incorporated into mechanical and electronic control systems and the like.

At startup, the system looks for the first synchronization code, which at this time could be either a valid synchronization code or an emulated (false or invalid) code. Upon detecting a synchronization code, various parameters are extracted from the subsequent header of the frame, such as bitrate, sampling frequency, number of channels, stereo mode, and in some cases an error detection code.

Certain combinations of parameter values are illegal, which will cause the synchronization code to be interpreted as invalid, thus triggering another immediate synchronization code search. By rejecting obviously false synchronization codes, the present system quickly detects the first available valid synchronization code.

This alone, however, is not enough to guarantee proper synchronization. For this reason, the present invention provides more requirements for synchronization code validation.

Once a synchronization code with a legal combination of subsequent parameters is found, the frame length can be calculated from the bitrate and the sampling frequency parameters. If the bitrate is not available (free format), the frame length is determined by counting the number of bytes or bits until the next valid synchronization code.

Either way, once the frame length or interval is established, the system "fast-forwards" through the bitstream for the calculated number of bits. If the synchronizer finds another valid synchronization code at the indicated location, the frame is considered "good", and the process repeats.

When a predetermined number, for example three, consecutive or successive "good" frames are decoded, the system determines that it is synchronized.

While attempting to establish synchronization, the audio data is not actually decoded; only the syntax is important. The system can therefore handle as many as 30 consecutive bad frames without disrupting the audio output. In this manner, under very bad conditions, the synchronization system can establish true synchronization extremely quickly.

Once synchronized, the decoder will decode and play all syntactically correct frames. However, the decoder will also attempt to decode syntactically incorrect frames if at all possible. If it is not possible, the decoder will fast-forward to the next synchronization code (which may or may not be valid) and decode from there. In either case, the resulting discontinuity in the audio output may or may not be audible.

This is impossible to predict, so a programmable switch allows the user to mute "bad" frames. The reason the errors are ignored and the bad frames are decoded is to help preserve the synchronization of the audio data with the video data. Hearing a slight glitch is preferable to losing lip-sync for a few seconds.

When the decoder encounters three consecutive "bad" frames (i.e., a synchronization code is not exactly where it is supposed to be, or header parameters are illegal), it finally "gives up" and declares itself desynchronized, and the whole synchronization process begins anew.

In summary, the present invention fills the need that has existed in the art by providing a reliable, faster synchronization system with a substantially improved tolerance for frames with errors, better tracking of bad frames, and maintenance of audio/video synchronization over the prior art.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
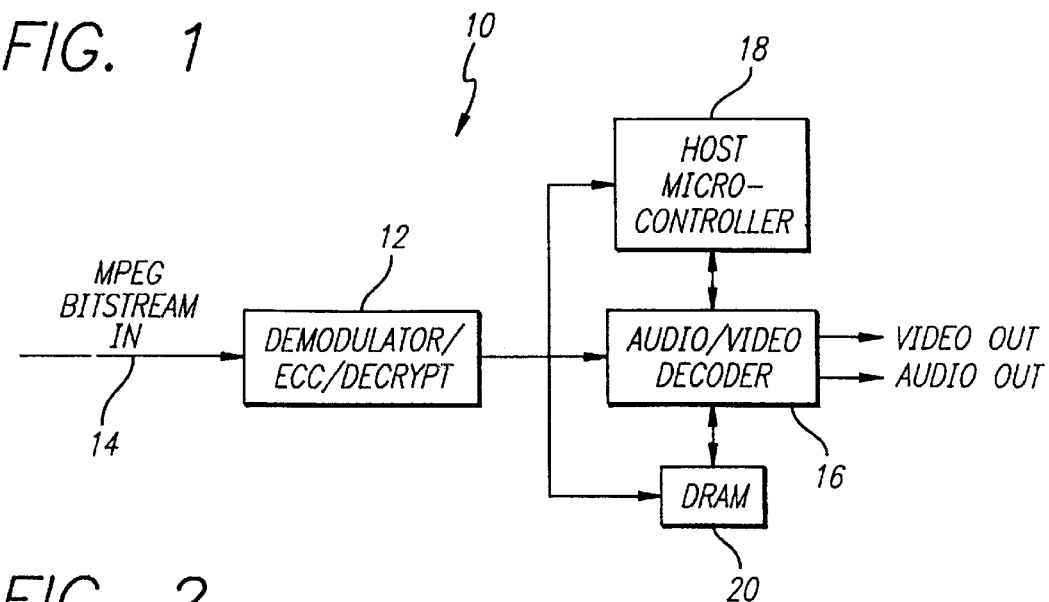
FIG. 1 is a block diagram illustrating a video/audio decoder comprising an audio decoding system according to the present invention.

A video/audio decoder system 10 embodying the present invention is illustrated in FIG. 1, and is intended to be offered as a commercial product of the LSI Logic Corporation of Milpitas, Calif., designated as the L64002 MPEG2 Audio/Video Decoder. The decoder 10 comprises a demodulator/ECC/decryption unit 12 for receiving an MPEG multiplexed bitstream from an encoder (not shown) via a communications channel 14. The unit 12 demodulates the input bitstream, performs error correction (ECC) and de-encrypts the demodulated data if it is encrypted for access limitation or data compression purposes.

The unit 12 applies the demodulated MPEG bitstream as digital data to a video/audio decoder 16, which de-multiplexes and decodes the bitstream to produce output video and audio signals in digital form.

The system 10 further comprises a host microcontroller 18 that interacts with the decoder 16 via an arrangement of interrupts as will be described in detail below. The decoder 16 and the microcontroller 18 have access to an external data storage such as a Dynamic Random Access Memory (DRAM) 20. It will be noted that the scope of the invention is not so limited, however, and that the memory 20 can be provided inside the decoder 16 or the microcontroller 18.

Figure 2:
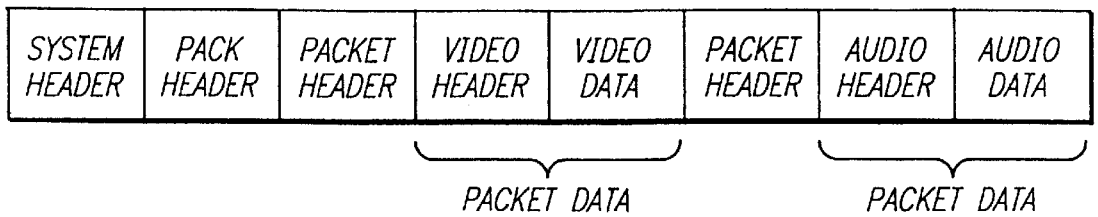
FIG. 2 is a simplified diagram illustrating a Motion Picture Experts Group (MPEG) data bitstream that is decoded by the decoder of FIG. 1.

A simplified, generic representation of an MPEG bitstream is illustrated in FIG. 2. The bitstream includes a system header that provides housekeeping and other information required for proper operation of the decoder 16. A pack header identifies a pack of data that comprises one or more packs, with each pack having a pack header. Each pack includes one or more video and/or audio access units (encoded frames), each of which is preceded by its own header having a frame Start Code (SC).

The MPEG system syntax governs the transfer of data from the encoder to the decoder. A system stream typically comprises a number of Packetized Elementary Streams (PES), which can be video or audio streams, that are combined together to form a program stream. A program is defined as a set of elementary streams which share the same system clock reference, so can be decoded synchronously to each other.

In MPEG 1 there are only two levels of hierarchy in the system syntax; the elementary stream and the program stream. In MPEG 2 there are more levels.

Figure 3A:
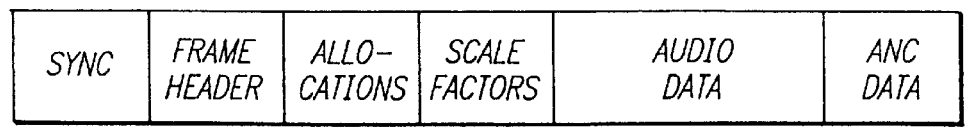
FIGS. 3a and 3b in combination constitute a diagram illustrating a frame of audio data of the bitstream of FIG. 2.

An audio presentation unit or frame is illustrated in FIG. 3a, and comprises a 12 bit synchronization code, binary 1111 1111 1111 ("FFF" in hexadecimal notation), followed by a frame header that specifies "side" information including the bitrate, sampling rate and the MPEG layer (I, II or III) that was used for encoding. This is followed by an allocation parameter, which specifies the number of bits used to code samples, and a scale factor which indicates a factor by which decoded audio samples are to be multiplied.

The actual data is encoded in the form of subframes or groups that follow the scale factor designation, with ancillary data optionally following the data subframes.

Figure 3B:
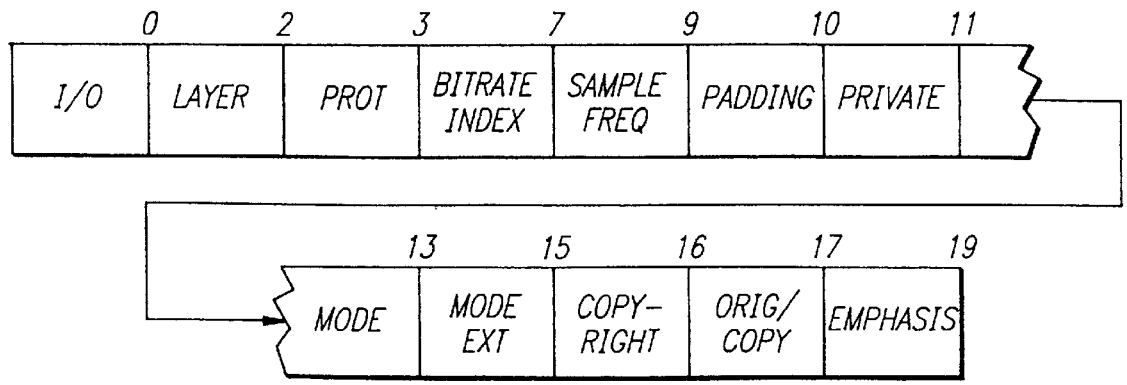

The arrangement of the audio frame header is illustrated in FIG. 3b and presented in tabular form below. The header consists of a total of 20 bits, the first bit being an identification or ID parameter that specifies the type of algorithm that was used to encode the data. This bit is "1" for ISO/IEC 11172-3 audio.

The next parameter is a two-bit "layer" value that specifies the layer protocol (I, II or III) that was used to encode the data. The value "00" is reserved, and can be considered as invalid.

A "protection_bit" follows the layer value, and indicates whether redundancy has been added ("0") or has not been added ("1") to facilitate error detection.

A four-bit "bitrate_index" is provided to indicate the bitrate. A value of "0000" indicates a free-format condition that is used in layer III encoding. This parameter has a "forbidden" value of "1111", which can be a major contributor to an invalid synchronization code.

The next parameter, "sampling_frequency", has a two-bit value that indicates the frequency at which the audio data was sampled. A value of "11" is reserved, can be considered as invalid, and can also contribute to an invalid synchronization code.

A "padding_bit" has a value of "1" if the frame contains an additional slot to adjust the mean bitrate to the sampling frequency, and a value of "0" if not. A "private_bit" is also included.

A two-bit "mode" parameter indicates the type of stereo mode. A two-bit "mode_extension" parameter is used in conjunction with the "mode" parameter in "joint_stereo" mode to indicate which subbands are in "intensity_stereo".

A "copyright" bit has a value of "1" if the data is protected by a copyright, and a value of "0" if it is not. An "original/copy" bit is "1" if the data is original, and "0" if it is a copy.

A two-bit "emphasis" parameter indicates the type of de-emphasis that is to be used, and has a reserved value of "10" that can be considered as invalid.

TABLE

MPEG AUDIO FRAME HEADER

| ITEM | BITS | BIT NOS. | INVALID VALUE |
| --- | --- | --- | --- |
| ID | 1 | 0 | |
| layer | 2 | 1–2 | 00 |
| protection_bit | 1 | 3 | |
| bitrate_index | 4 | 4–7 | 1111 |
| sampling_frequency | 2 | 8–9 | 11 |
| padding_bit | 1 | 10 | |
| private_bit | 1 | 11 | |
| mode | 2 | 12–13 | |
| mode_extension | 2 | 14–15 | |
| copyright | 1 | 16 | |
| original/copy | 1 | 17 | |
| emphasis | 2 | 18–19 | 10 |

The syntax of a string of 20 consecutive bits can be examined to determine if the string is a valid audio frame header. In addition to the forbidden and reserved values described above, various other parameter values and/or combinations thereof may be invalid in a particular application. Thus, if any invalid parameter values are present in a 20-bit string, it cannot constitute a valid audio frame header.

Figure 4:
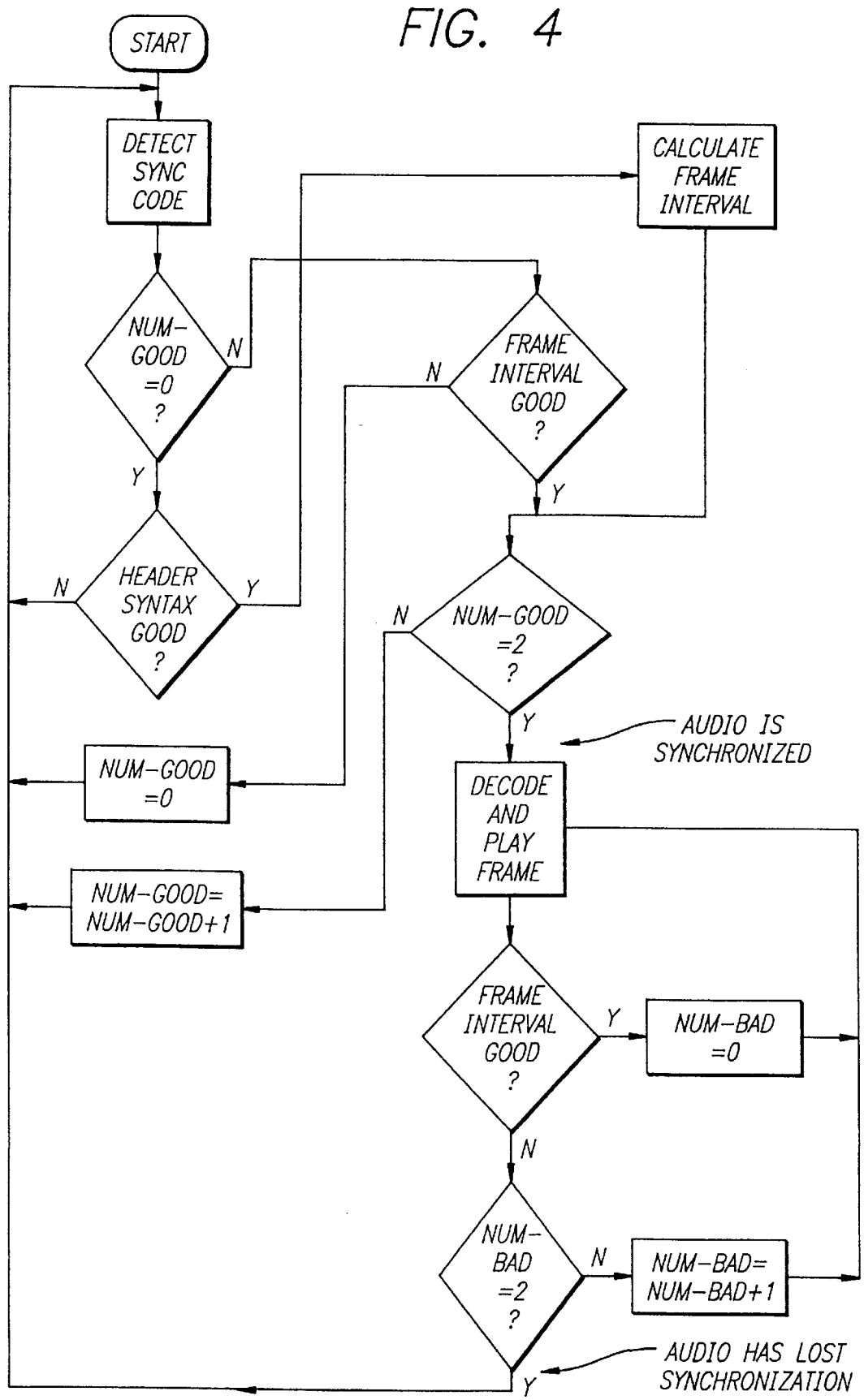
FIG. 4 is a flowchart illustrating a method of synchronizing an audio decoding system according to the present invention.

An MPEG audio synchronization method embodying the present invention is illustrated in the form of a flowchart in FIG. 4. A decoding operation is initially synchronized by sensing the input bitstream to detect a synchronization code, which in the MPEG specification consists of the 12-bit string 1111 1111 1111 (hexadecimal "FFF"). As described above, this string may represent a valid synchronization code, or may be invalid due to emulation or data errors.

After the first FFF string is detected, the next 20 bits of the bitstream are examined to determine if they have the correct syntax to constitute a valid audio frame header. The criteria for performing this operation are described above.

If the header syntax is good, indicating that the frame is valid, the frame length or the interval between frames (which is constant) is calculated. An MPEG layer I or II header includes information in the form of the bitrate_index and sampling_frequency parameters that enable calculation of the frame interval. The bitrate is determined from the bitrate_index in a conventional manner using a look-up table as provided in the MPEG specification.

More specifically, for layer I, the interval between successive synchronization codes is expressed as a number of slots N by N=12×(bitrate/sampling frequency) where each slot N includes 32 bits.

For layer II, the number of slots N is given as

N=144×(bitrate/sampling frequency) where each slot N includes 8 bits.

For layer III, a free-form data structure is used, and the frame interval is not specified in the frame header data. In this case, the frame interval is determined by counting the number of bits between the first and second FFF strings.

The counter NUM_GOOD is checked to determine if its value is 2. If so, it indicates that the frame being checked is the third valid frame. The system then determines that the audio has been synchronized, and proceeds to decode and present or play successive frames of audio data. If not, the counter NUM_GOOD is set to zero, and the operation branches back to look for another FFF string.

After each FFF string is detected and the frame syntax is checked, the proper frame interval is calculated again. The system then counts the bits between the FFF string and the next detected FFF string and compares this value with the proper frame interval.

If the numbers are equal, it means that another valid frame has been detected. If it is the third valid frame, synchronization is determined as described above, and successive frames are decoded and played. If not, the operation branches back to look for another successive valid frame.

Although the operation has been described above as detecting valid audio frames by determining only if their synchronization codes are spaced from the previous synchronization codes by the proper interval (number of bits), and the syntax and parameters of their frame headers are correct, the invention is not so limited. For example, the Cyclic Redundancy Codes (CRC) and/or any other suitable parameters can additionally be used to detect data errors.

In accordance with this operation, the system will determine synchronization only if three consecutive or successive valid frames are found, and will continue sensing the bitstream until this condition is met.

Once synchronization has been determined, the system checks incoming frames for validity. This is done by checking the numbers of bits between successive synchronization codes (frame intervals), the header syntax, and optionally the CRC code as described above. However, one bad frame will not cause the system to lose synchronization, and three successive bad frames are required for this condition to occur.

Each frame is sensed to determine if its frame interval and header syntax are correct. If so, a counter NUM_BAD is set to zero and the next frame is examined. If not, the counter NUM BAD is incremented and the next frame is examined. If three successive bad or invalid frames are detected, the system is determined to have lost synchronization, and the operation branches back to the beginning to re-establish synchronization.

It will be noted that the number three is not limitative of the scope of the invention, and that any number of successive good or bad frames can be required to establish or lose synchronization. It is further within the scope of the invention to set the numbers of frames to establish and lose synchronization to have different values respectively.

The present synchronization method is hysteretic in that it is harder to establish or lose synchronization than using prior art methodologies in which synchronization is established or lost based on one synchronization code. In accordance with the present invention, three successive valid synchronization codes are necessary to establish synchronization, whereas three invalid synchronization codes are necessary to lose synchronization.

In this manner, the problems of false initial synchronization based on emulated synchronization codes or data errors, and easy loss of synchronization based on data errors which have existed in the prior art are overcome in accordance with the present invention.

Checking the syntax of a frame while not synchronized is 46 times faster than decoding and playing a frame. So, the decoder could lose synchronization, encounter 43 bad frames, regain synchronization and decode again without ever interrupting the output presentation.

It has been determined that this allows the decoder to establish initial synchronization and re-establish synchronization after a loss thereof more quickly than if the decoder is turned off while the system is unsynchronized. Preferably, a programmable switch is provided which allows the user to mute "bad" frames that are decoded. Hearing a slight glitch is preferable to losing lip-sync for several seconds.

However, it is within the scope of the invention to turn off the decoder, or prevent the decoder from decoding audio frames, while the system is unsynchronized. The latter alternative can be accomplished by disconnecting the input bitstream from the input of the decoder.

Figure 5A:
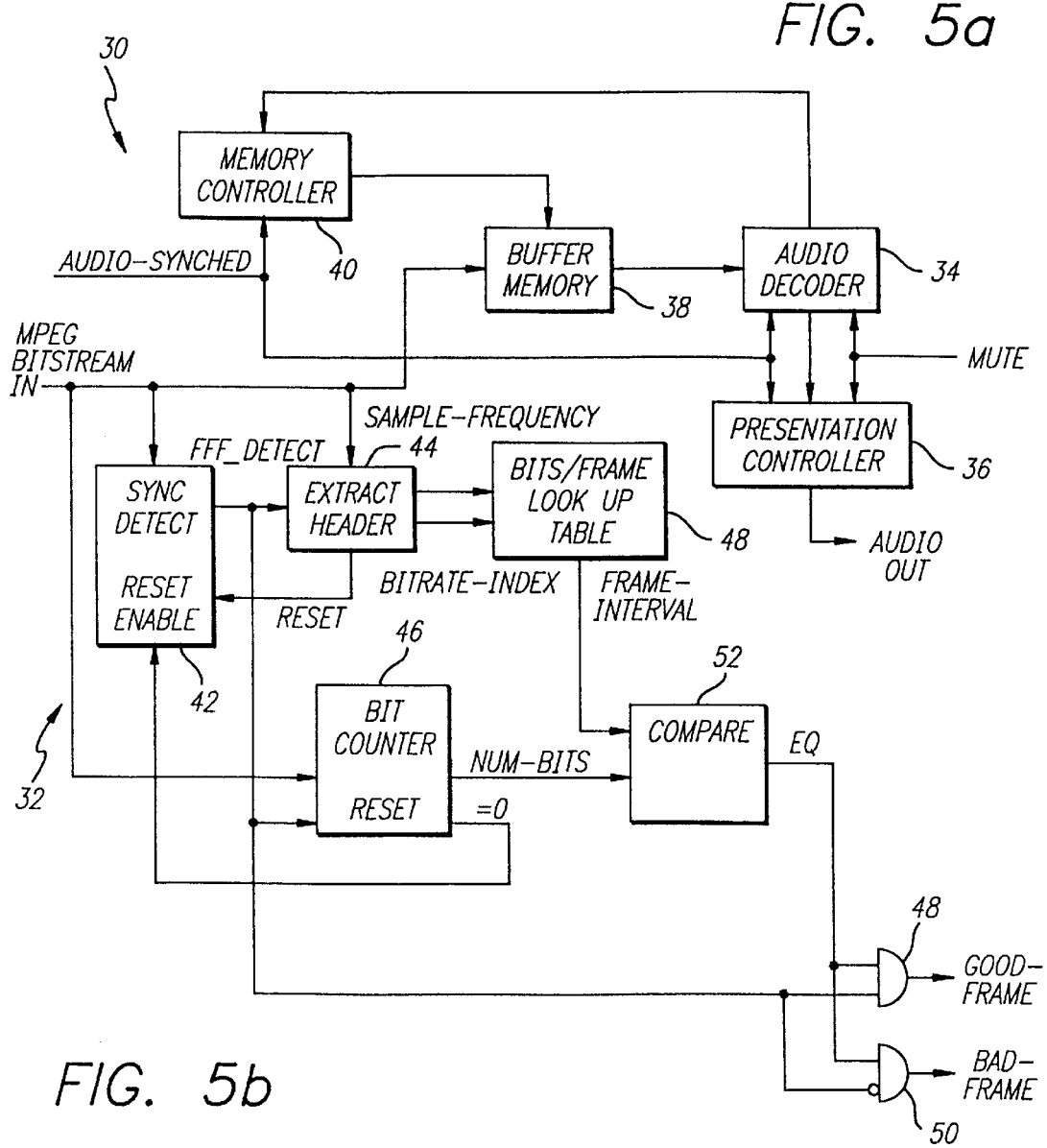
FIGS. 5a and 5b in combination constitute a block diagram illustrating an audio decoder synchronization system according to the present invention.
Figure 5B:
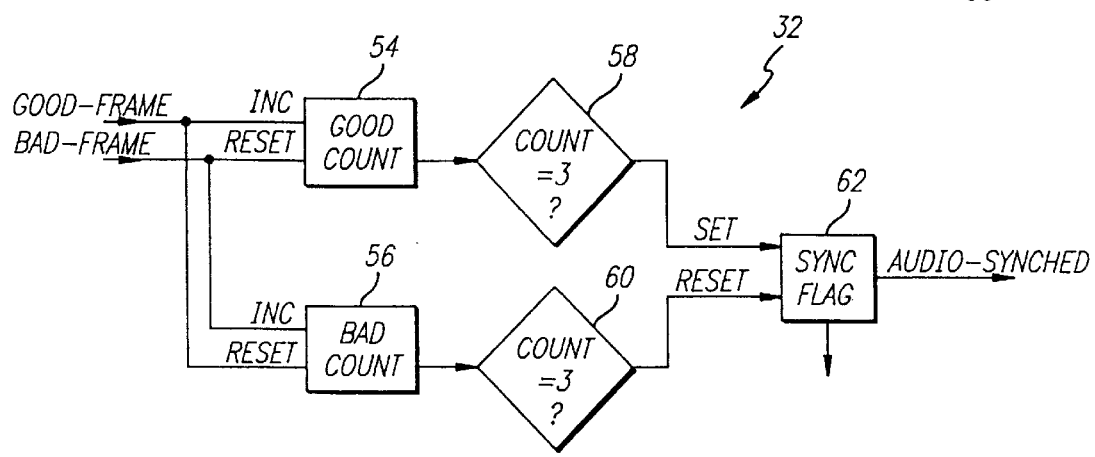

An audio decoding system 30 which is part of the audio/video decoder 16 is illustrated in FIGS. 5a and 5b. The present system 30 includes a synchronizer 32 which receives the input MPEG bitstream directly from the communication channel and synchronizes decoding of the audio frames using the method described with reference to FIG. 4.

The input bitstream is also applied to an audio decoder 34 which decodes the audio data (frames or access units AU) to produce decoded presentation units (PU) that are applied to a presentation controller 36 for presentation or playing.

The audio data is stored in a buffer memory 38, which is preferably a circular First-In-First-Out (FIFO) unit, having a write pointer and a read pointer that are controlled by a memory controller 40. The audio frames are generally stored asynchronously in the memory 40 as received, with the write pointer being automatically incremented. Frames are read out of the memory 40 and applied to the decoder 34 for decoding and presentation from the location of the read pointer, which is controlled by the decoder 34 as required by the decoding operation.

The synchronization system 32 generates an output signal "AUDIO_SYNCHED" having a logically high value when the system 30 is synchronized and a logically low value when the system 30 is unsynchronized. The AUDIO_SYNCHED signal is applied to the memory controller 40, the audio decoder 34 and/or to the presentation controller 36. Further illustrated is a user programmable "mute" signal that is applied to the decoder 34 and/or to the presentation controller 36 to selectably enable muting of the decoded output frames (audio presentation units PU) from the decoder 34.

When the signal AUDIO_SYNCHED is high, the decoding operation proceeds in a normal manner. When the signal AUDIO_SYNCHED is low, the decoder 34 performs syntax checking only, at high speed. Muting may not be necessary if synchronization can be re-established quickly.

The synchronizer 32 comprises a synchronization detecting unit 42 that detects synchronization codes when an enable input thereof is high. The unit 42 generates an FFF DETECT pulse upon detection of an FFF string in the input MPEG bitstream, which is applied to an extract header unit 44, a bit counter 46, a non-inverting input of an AND gate 48 and an inverting input of an AND gate 50.

In response to the FFF_DETECT pulse, the unit 44 extracts the 20 bits following the FFF string to determine if they constitute a valid audio frame header. If so, the unit 44 extracts the bitrate_index and sample_frequency from the header and applies them to a look-up table 48. If not, the unit 44 applies a reset signal to the unit 42 to cause the frame to be rejected.

The table 48 produces a signal FRAME_INTERVAL constituted by the number of bits corresponding to the frame length or interval as described above, and applies it to an input of a compare unit 52. The counter 46 is reset to zero by the FFF_DETECT pulse, and begins counting bits of the bitstream starting with the first bit following the FFF synchronization code (the first bit of the header). The count output of the counter 46 is applied to another input of the compare unit 52.

The AND gates 48 and 50 are enabled by the FF_DETECT pulse at the time the next FFF string is detected by the unit 42. The counter 46 is reset to zero by the next FF_DETECT pulse, and produces a high zero output which is applied to the enable input of the unit 42.

If the next FFF string is a valid synchronization code, the count of the counter 46 will be equal to the FRAME_INTERVAL value from the table 48 at the time the next FF_DETECT pulse is generated, the compare unit 52 will produce a high output, and the AND gate 48 will produce a high output designated as GOOD_FRAME. This indicates that the next synchronization code was spaced from the previous synchronization code by the proper frame interval, and that the frame is valid.

If the next FFF string is not received at the proper frame interval (either too soon or too late), the count in the counter 46 will not be equal to FRAME_INTERVAL at the time the corresponding FF_DETECT pulse is generated, and the AND gate 50 will produce a signal BAD_FRAME indicating that the frame is invalid.

As illustrated in FIG. 5b, the system 32 comprises a good frame counter 54 and a bad frame counter 56. The GOOD_FRAME signal is applied to an increment input of the good frame counter 54 and to a reset input of the bad frame counter 56, and vice-versa. Thus, each GOOD_FRAME signal causes the counter 54 to be incremented and resets the counter 56, and each BAD_FRAME signal causes the counter 56 to be incremented and resets the counter 54.

In response to three or more successive GOOD_FRAME signals, the count output of the counter 54 becomes equal to or larger than three, and a good count compare unit 58 generates a SET signal. This causes a set-reset flip-flop 62 to generate a logically high AUDIO_SYNCHED signal, which designates that the system 30 is synchronized.

Conversely, in response to three or more successive BAD_FRAME signals, the count output of the counter 56 becomes equal to or larger than three, and a bad count compare unit 60 generates a RESET signal. This causes the flip-flop 62 to generate a logically low AUDIO_SYNCHED signal, which designates that the system 30 has lost synchronization.

It will be noted that regardless of the count in one of the counters 54 and 56, the counter 54 or 56 will be reset by a GOOD_FRAME signal or a BAD_FRAME signal respectively, and that the counters 54 and 56 in combination with the compare units 58 and 60 provide the present hysteretic functionality.

As described above, the synchronizer 32 senses the input bitstream "on the fly" before the data is decoded by the decoder 34. However, if the buffer memory 38 has a sufficiently large capacity, it is possible to store a number of audio frames in the memory 38 and arrange the synchronizer 32 to "fast forward" through the stored frames rather than sensing the bitstream on the fly.

In this case, it is possible to identify a number of invalid frames in advance, skip decoding the invalid frames and repeat previous or subsequent valid frames to fill the gap left by the invalid frames. This alternative can be more desirable than muting bad frames, as no "glitch" or silent interval will be created in the presentation. However, it has the disadvantage of requiring a substantially larger memory than the system as described and illustrated.

In summary, the present invention fills the need that has existed in the art by providing a reliable, faster synchronization system with a substantially improved tolerance for frames with errors, better tracking of bad frames, and maintenance of audio/video synchronization over the prior art.

In accomplishing these goals, the present system overcomes the heretofore existing problems by preventing false initial synchronization, while also presenting loss of synchronization caused by occasional data errors.

Various modifications will become possible for those skilled in the art after receiving the teachings of the present disclosure without departing from the scope thereof.

We claim:

1. A system for synchronizing a data processing unit to a bitstream having synchronization codes successively spaced by a predetermined interval with data for processing disposed between the synchronization codes, said bitstream having a data header comprising a bitrate and a sampling frequency, said system comprising:
   a detector for detecting said synchronization codes;
   a sensor for sensing intervals between successive synchronization codes;
   a comparator for comparing said intervals with said predetermined interval;
   a controller for determining both:
   (A) whether the system is synchronized to the bitstream after the comparator has detected a first predetermined number of said intervals; and
   (B) whether the system is unsynchronized to the bitstream after the comparator has detected a second predetermined number of said intervals; and
   a header sensor for sensing said data header and calculating said predetermined interval from said information.

2. A system according to claim 1, wherein the header sensor calculates said predetermined interval as a function of bitrate and sampling frequency.

3. A system according to claim 1, wherein said first predetermined number of said intervals corresponds to successive synchronization codes equal to said predetermined interval;
   wherein said second predetermined number of said intervals corresponds to successive synchronization codes that are not equal to said predetermined interval.

4. A system according to claim 1, wherein said data header includes information from which said predetermined interval can be calculated.

5. A system for synchronizing a data processing unit to a bitstream having successively spaced synchronization codes and data disposed between the synchronization codes, the bitstream further comprising a data header following each synchronization code including information from which intervals between successive synchronization codes can be calculated, the system comprising:
   a detector for detecting said synchronization codes;
   a sensor for sensing intervals between successive synchronization codes;
   a comparator for comparing said intervals with synchronization code intervals;
   a controller for determining if the system is synchronized to the bitstream depending on satisfaction of a first predetermined condition and if the system is unsynchronized to the bitstream depending on satisfaction of a second predetermined condition; and
   a sensor for sensing said data header and calculating intervals between successive synchronization codes from said information.

6. A system as in claim 5, wherein said first predetermined condition comprises the comparator having detected a first predetermined number of said intervals and the second predetermined condition comprises the comparator having detected a second predetermined number of said intervals.

7. A system as in claim 6, wherein said first predetermined number corresponds to successive synchronization codes equal to said predetermined interval and said second predetermined number corresponds to successive synchronization codes not equal to said predetermined interval.

8. A system as in claim 6, wherein said first and second predetermined numbers are each greater than one.

9. A system as in claim 6, wherein said first and second predetermined numbers are equal.

10. A system as in claim 5, in which:
    said data comprises frames of encoded audio data; and
    the processing unit comprises a decoder for decoding said frames.

11. A system as in claim 10, wherein the controller further inhibits the decoder from outputting frames of decoded data while the system is unsynchronized to said bitstream.

12. A system as in claim 10, wherein the controller further inhibits the decoder from decoding said frames based on a third predetermined condition.

13. A system according to claim 12, wherein the third predetermined condition comprises the system being unsynchronized to said bitstream.

14. A system as in claim 5, wherein the header sensor senses and detects header syntax and the controller determines that the system is synchronized to the bitstream if the header sensor detects that said header syntax following a first one of said successive synchronization codes is normal.

15. A system as in claim 5, wherein:
    said bitstream comprises bits of data such that said intervals between successive synchronization codes corresponds to a number of said bits; and
    the system further comprises a counter for counting said bits between successive synchronization codes to determine said number of said bits and said interval between successive synchronization codes.

16. A method for synchronizing a data processing system to a bitstream including synchronization codes successively spaced from each other by a predetermined interval, data disposed between the synchronization codes, and a data header including information from which said predetermined interval can be calculated, comprising the steps of:
    (a) detecting said synchronization codes;
    (b) sensing intervals between successive synchronization codes;
    (c) comparing said intervals with said predetermined interval;
    (d) determining that the system is synchronized to the bitstream based on a first predetermined condition;
    (e) determining that the system is unsynchronized to the bitstream based on a second predetermined condition; and
    (f) sensing said data header and calculating said predetermined interval from said information between steps (a) and (c).

17. A method as in claim 16, wherein:
    said information comprises a bitrate and a sampling frequency; and
    step (f) comprises calculating said interval as a predetermined function of the bitrate and the sampling frequency.

18. A method as in claim 17, wherein the predetermined function is N=K(bitrate/sampling frequency), where N is said predetermined interval and K is a predetermined constant.

19. A method as in claim 16, wherein said first predetermined condition is:
    after a first predetermined number of said intervals corresponding to successive synchronization codes equal to said predetermined interval have been detected; and
    said second predetermined condition is:
    after a second predetermined number of said intervals corresponding to successive synchronization codes that are not equal to said predetermined interval have been detected.

20. A method for synchronizing a data processing system to a bitstream including synchronization codes spaced at a predetermined interval, data disposed between the synchronization codes, and a data header including information from which said predetermined interval can be calculated, comprising the steps of:
    (a) detecting said synchronization codes;
    (b) sensing intervals between successive synchronization codes;
    (c) comparing said intervals with said predetermined interval;
    (d) determining system synchronization and unsynchronization based on predetermined conditions, wherein:
    (e) sensing said header and calculating said predetermined interval from said information between steps (a) and (c).

21. A method as in claim 20, wherein said predetermined conditions comprise:
    the system is synchronized to the bitstream after a first predetermined number of said intervals corresponding to successive synchronization codes that are equal to said predetermined interval have been detected; and
    the system is unsynchronized to the bitstream after a second predetermined number of said intervals corresponding to successive synchronization codes that are not equal to said predetermined interval have been detected.

22. A method as in claim 21, wherein said first and second predetermined numbers are each larger than one.

23. A method as in claim 21, wherein said first and second predetermined numbers are equal.

24. A method as in claim 20, wherein:
    said data comprises frames of encoded audio data;
    the system comprises a decoder for decoding said frames; and
    step (d) further comprises synchronizing the decoder to said frames.

25. A method as in claim 20, wherein step (d) further comprises inhibiting the decoder from outputting frames of decoded data while the system is unsynchronized to said bitstream.

26. A method as in claim 20, wherein step (e) further comprises inhibiting decoding said frames while the system is unsynchronized to said bitstream.

27. A method as in claim 20, wherein:
    the method further comprises the step, performed prior to step (c), of:
    (f) sensing and detecting header syntax following a first one of said successive synchronization codes.

28. A method as in claim 27, wherein step (d) further comprises determining that the system is synchronized to the bitstream only if said syntax of said header following said first one of said successive synchronization codes is normal.

29. A method as in claim 20, wherein:
    said bitstream comprises bits of data such that said predetermined interval corresponds to a number of said bits; and
    the method further comprises the step, performed prior to step (c), of:
    (f) counting said bits between successive synchronization codes to determine said number of said bits and said corresponding predetermined interval.

* * * * *